United States Patent
Seki et al.

(10) Patent No.: US 7,807,959 B2
(45) Date of Patent: Oct. 5, 2010

(54) SCREEN, REAR PROJECTOR, AND IMAGE DISPLAY DEVICE HAVING A PLURALITY OF DRIVING UNITS EACH WITH A POWER SOURCE THAT ARE CAPABLE OF EFFECTIVELY REDUCING SCINTILLATION

(75) Inventors: Hideya Seki, Okaya (JP); Eiji Morikuni, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 764 days.

(21) Appl. No.: 11/734,558

(22) Filed: Apr. 12, 2007

(65) Prior Publication Data

US 2008/0037117 A1  Feb. 14, 2008

(30) Foreign Application Priority Data

Apr. 17, 2006  (JP)  ............................. 2006-113449

(51) Int. Cl.
*H01J 5/02*  (2006.01)
(52) U.S. Cl. .................................... 250/239; 250/208.1
(58) Field of Classification Search ................ 250/216, 250/208.1, 239; 353/30, 38, 122; 359/443–457; 345/419
See application file for complete search history.

(56) References Cited

U.S. PATENT DOCUMENTS

| | | | | |
|---|---|---|---|---|
| 3,610,728 | A | * | 10/1971 | Firth ........................ 359/446 |
| 3,640,602 | A | | 2/1972 | Wofle |
| 4,143,943 | A | | 3/1979 | Rawson |
| 4,390,239 | A | * | 6/1983 | Huber ...................... 359/446 |

FOREIGN PATENT DOCUMENTS

| | | |
|---|---|---|
| JP | A 11-38512 | 2/1999 |
| JP | A 2001-100316 | 4/2001 |
| JP | A 2001-100317 | 4/2001 |

* cited by examiner

*Primary Examiner*—Que T Le
(74) *Attorney, Agent, or Firm*—Oliff & Berridge, PLC (57) ABSTRACT

A screen includes a screen main body that has a diffusion layer, a frame that is provided along the circumference of the screen main body, and to which the diffusion layer is attached through supporting members to rock, and a driving unit that is mounted on the diffusion layer and moves the diffusion layer in parallel to a surface of the diffusion layer.

11 Claims, 10 Drawing Sheets

SCREEN, REAR PROJECTOR, AND IMAGE DISPLAY DEVICE HAVING A PLURALITY OF DRIVING UNITS EACH WITH A POWER SOURCE THAT ARE CAPABLE OF EFFECTIVELY REDUCING SCINTILLATION

BACKGROUND

1. Technical Field

The present invention relates to a screen, a rear projector, and an image display device.

2. Related Art

In recent years, a projector has been rapidly spread. In addition to a front projection type projector that is mainly used for a presentation, a rear projection type projector has been increasingly recognized as a large-screen projector. A projection type display device is advantageous in that it can provide a product having the same screen size at a low cost, as compared with a direct-view-type display, such as a liquid crystal television or a PDP. However, the direct-view-type display device has become inexpensive, and a high image quality has been required in the projection type display device.

A projector radiates light emitted from a light source onto a light modulating element, such as a liquid crystal light valve, projects the projection light modulated by the light modulating element onto a screen, and displays an image on the screen. When the image is displayed on the screen, so-called scintillation occurs in which an entire surface of the screen flickers.

In this case, a scintillation occurrence principle will be described with reference to FIGS. 12A and 12B.

Figure 12A:
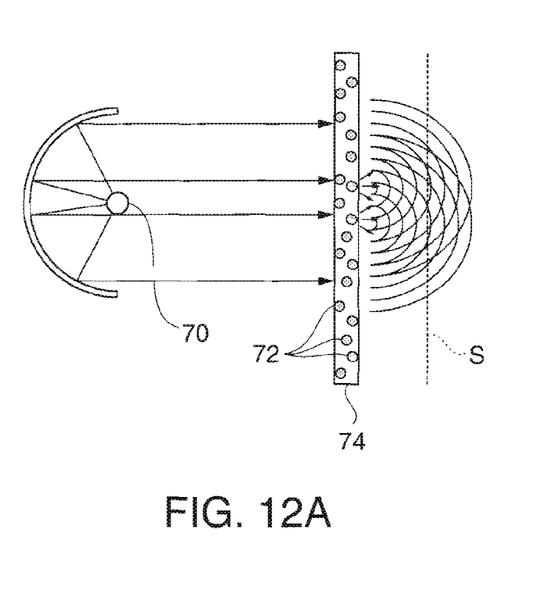
FIGS. 12A and 12B are diagrams illustrating scintillation.
Figure 12B:
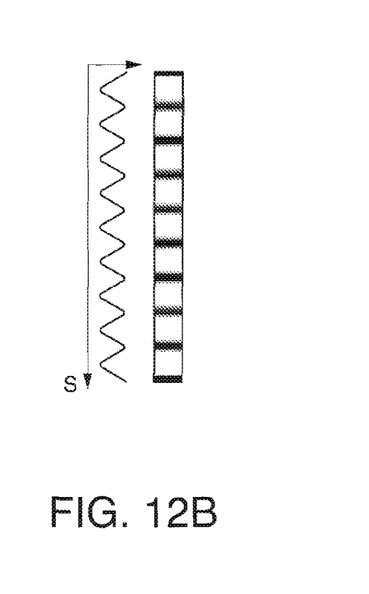

As shown in FIGS. 12A and 12B, light emitted from a light source 70 passes through liquid crystal light valves, and is then projected onto a screen 74 including a diffusion member 72. The projection light that is projected onto the screen 74 is diffused by the diffusion member 72 included in the screen 74. The diffused light is diffracted by the diffusion member 72 at the time of passing through the screen, and acts like a two-dimensional wave. As shown in FIG. 12B, two spherical waves by the two-dimensional wave are intensified or weakened according to a phase relationship between the two waves, and appears as an interference fringe between a surface of the screen and a viewer. If the viewer focuses on an image surface S where the interference fringe is generated, the viewer recognizes the interference fringe as scintillation that causes the screen surface to flicker.

The scintillation gives unpleasantness to a viewer viewing the image formed on the surface of the screen, as if a veil, a cloth, or a cobweb extends between the screen surface and the viewer. Further, the viewer becomes view a double image like the screen surface and the scintillation through eyes, and focuses on each of the screen surface and the scintillation. As a result, the viewer feels fatigued.

In recent years, instead of a high pressure mercury lamp as a light source of a projector, it is required for a new light source to be developed. In particular, the laser light source has been anticipated as a light source for a next-generation projector, in terms of energy efficiency, color reproducibility, a long life span, instantaneous lighting, or the like. However, instead of a high pressure mercury lamp as a light source of a projector, when using a laser light source causing high interference, contrast of the interference fringe becomes higher, it becomes hard to endure unpleasantness or fatigue due to scintillation.

Accordingly, various technologies for reducing the scintillation have been suggested.

For example, JP-A-11-38512 discloses a screen which includes an emissions-side light diffusion layer that is formed of a plastic material where a light diffusion material is mixed, a middle layer that is formed of a transparent plastic material, and an incidence-side light diffusion layer that is formed of a plastic material where a light, diffusion material is mixed. According to this screen, the scintillation that occurs due to the incident-side light diffusion layer is diffused again by the emission-side light diffusion layer, which reduces the occurrence of the scintillation.

Further, JP-A-2001-100316 and JP-A-2001-100317 disclose screens for image projection in which at least one layer of light diffusion layers forming the screen for image projection is caused to vibrate therein, and thus relative positional relationships between the light diffusion layers are varied. As such, an internal vibration is applied to the light diffusion layers, which reduces the occurrence of the scintillation.

However, according to the methods of reducing scintillation that are disclosed in JP-A-11-38512, JP-A-2001-100316, and JP-A-2001-100317, the following problems are generated.

According to the method disclosed in JP-A-11-38512, since the emission-side light diffusing layer is fixed, a phase distribution in a space between a screen and a viewer, which is formed by interference between light rays emitted from respective points on a diffusion surface, is fixed, and an interference fringe is also viewed as a fixed image. Accordingly, there is a problem in that it is not possible to reduce the scintillation.

According to the methods disclosed in JP-A-2001-100316 and JP-A-2001-100317, since various vibration means, such as light, an electric field, a magnetic field, a heat, or a stress, are used, an extra driving energy is needed. Further, when using the vibration means, efficiency of an energy transmitted to a diffusion layer is low, and it becomes difficult for a viewer to comfortably view a screen due to vibrations, sounds, unnecessary electromagnetic waves, exhaust neat, or the like. Further, when the diffusion layer vibrates in a z direction (focus direction), since an image height is varied, and a location of an outline of the image in the x-y direction is also varied, which causes a defocus.

SUMMARY

An advantage of some aspects of the invention is that it provides a screen, a rear projector, and an image display device that are capable of effectively reducing scintillation.

According to a first aspect of the invention, a screen includes a screen main body that has a diffusion layer, a frame that is provided along the circumference of the screen main body, and to which the diffusion layer is attached through supporting members to rock, arid a driving unit that is mounted on the diffusion layer and moves the diffusion layer in parallel to a surface of the diffusion layer.

According to this structure, since the diffusion layer of the screen main body is attached to the frame to rock, when the driving unit is driven, the diffusion layer moves in parallel to the surface of the diffusion layer. As a result, a diffusion state of the light that has passed through the diffusion layer of the screen main body is varied, which varies a pattern of an interference fringe that is generated by diffusion and diffraction of the diffusion layer of the screen main body. Therefore, since the light interference is reduced each other, it is possible to reduce the scintillation.

Further, according to this structure, the diffusion layer of the screen main body moves in parallel to the surface of the diffusion layer, and does not move in a direction crossing the surface of the diffusion layer. In this case, the direction along the surface of the diffusion layer is defined as the x-y direction, and the direction that crosses the x-y direction is defined as the z direction. Accordingly, the defocus can be suppressed while the scintillation can be reduced. Furthermore, since the diffusion layer does not move in the z direction, the surface of the diffusion layer does not generate the air compressing surface, which suppresses sounds and vibrations from being generated.

Preferably, the supporting members are elastic members.

According to this structure, the power that is supplied from the driving unit to the diffusion layer of the screen main body is transmitted to the elastic member. The power that is transmitted to the elastic member is repulsed from the diffusion layer by means of an elastic force of the elastic member. As a result, in addition to the power supplied from the driving unit, the diffusion layer of the screen main body is biased by the elastic member, and moves in parallel to the surface of the diffusion layer. Accordingly, it is possible to further effectively move the diffusion layer.

Preferably, the driving unit rotates around a rotation shaft that extends to be substantially vertical to the surface of the diffusion layer, and the driving unit is mounted on at least one location of the diffusion layer of the screen main body.

According to this structure, since the driving unit rotates around the rotation shaft that is vertical to the surface of the diffusion layer, it is possible to make the diffusion layer of the screen main body circularly move in parallel to the surface of the diffusion layer.

Further, according to the driving unit, since it is possible to make the diffusion layer circularly move, the motion of the diffusion layer having no discontinuous point is possible, different from the case of the reciprocal motion. Accordingly, the scintillation can be further reduced.

Preferably, the diffusion layer of the screen main body has a rectangular shape, the driving units are mounted on at least two locations of corners of the diffusion layer of the screen main body, and the driving units that are mounted on the corners of the diffusion layer are simultaneously driven.

According to this structure, the at least two locations of the diffusion layers of the screen main body are respectively mounted with the driving units, and the driving units are simultaneously driven. Therefore, it is possible to further smoothly move the diffusion layers.

Preferably, the diffusion layer of the screen main body has a rectangular shape, and on at least one of sides of the diffusion layer of the screen main body which face each other, a guide unit is provided to slidably move the diffusion layer in a direction along the side.

According to this structure, since the guide unit is provided along the side of the diffusion layer (in parallel to the surface of the diffusion layer), it is possible to surely prevent the diffusion layer from moving in the z direction.

Preferably, the screen main body has a plurality of diffusion layers, the plurality of diffusion layers are disposed on an optical path axis of light that is projected onto the plurality of diffusion layers, at least two diffusion layers of the plurality of diffusion layers are attached to the frame through the supporting members to rock, and the driving unit is mounted on at least one of the plurality of diffusion layers that are attached to the frame through the supporting members.

According to this structure, since the plurality of diffusion layers are attached to the frame through the supporting members to rock and the driving units are mounted on the diffusion layers, each of the plurality of diffusion layers relatively moves. As a result, the locations of the plurality of diffusion layers are relatively varied, and the diffusion state of the light that passes through the screen is temporally varied, which varies the pattern of the interference fringe that is generated by diffusion and diffraction of the diffusion layers of the screen main body. Accordingly, as compared with the case where the diffusion layer is a single layer, since the plurality of diffusion layers can be relatively moved, the pattern of the interference fringe is integrally averaged by means of a residual image effect of eyes of the viewer, and the scintillation can be more effectively reduced.

Preferably, at least portions of neighboring diffusion layers among the plurality of diffusion layers attached to the frame through the supporting members come into contact with each other, and the driving unit is mounted on at least one diffusion layer of the diffusion layers coming into contact with each other.

According to this structure, when the driving unit is mounted on one diffusion layer among the plurality of diffusion layers attached to the frame, the power that is transmitted from the driving unit to the diffusion layer is transmitted to the neighboring diffusion layers due to the friction of the contact portions. Accordingly, it is possible to manually move the diffusion layers on which the driving units are not mounted, and the scintillation can be more effectively reduced.

Preferably, the supporting member that corresponds to each of the diffusion layers attached to the frame has a different resonance frequency.

According to this structure, since the supporting member that corresponds to each of the diffusion layers has the different resonance frequency, each of the diffusion layers vibrates at each resonance frequency. As a result, since each of the diffusion layers can be individually vibrated, it is possible to further effectively reduce the scintillation.

Preferably, a resonance frequency of the supporting member and a driving frequency of the driving unit are substantially equal to each other.

According to this structure, since the resonance frequency of the supporting member and the driving frequency of the driving unit are substantially equal to each other, it is possible to effectively drive the diffusion layer with low energy.

According to a second aspect of the invention, a rear projector includes a light source that emits light, a light modulating element that modulate the light emitted from the light source, and the above-described screen onto which the light modulated by the light modulating element is projected.

According to this structure, since the screen is included, it is possible to provide a rear projector in which the scintillation is reduced.

According to a third aspect of the invention, an image display device includes a light source that emits light, the above-described screen, and a scanning unit that scans the light emitted from the light source on the screen.

According to this structure, since the screen is included, it is possible to provide an image display device in which the scintillation is reduced.

BRIEF DESCRIPTION OF THE DRAWINGS

The invention will be described with reference to the accompanying drawings, where like numbers refer like elements.

DESCRIPTION OF EXEMPLARY EMBODIMENTS

Hereinafter, preferred embodiments of the invention will be described with reference to the accompanying drawings.

The scale of each layer or member has been adjusted in order to have a recognizable size in the respective drawings used in the below description. Further, in the description below, a xyz orthogonal coordinate system is set, and positional relationships among respective members will be described with reference to the xyz orthogonal coordinate system. In addition, a predetermined direction in a horizontal plane is defined as an x direction, a direction that is orthogonal to the x direction in the horizontal plane is defined as a y direction, and a direction that is orthogonal to each of the x and y directions is defined a z direction. In this embodiment, a front side of a screen 20 is defined as a viewer side where a viewer views an image, and a reverse side thereof is defined as a rear side.

First Embodiment

Figure 1A:
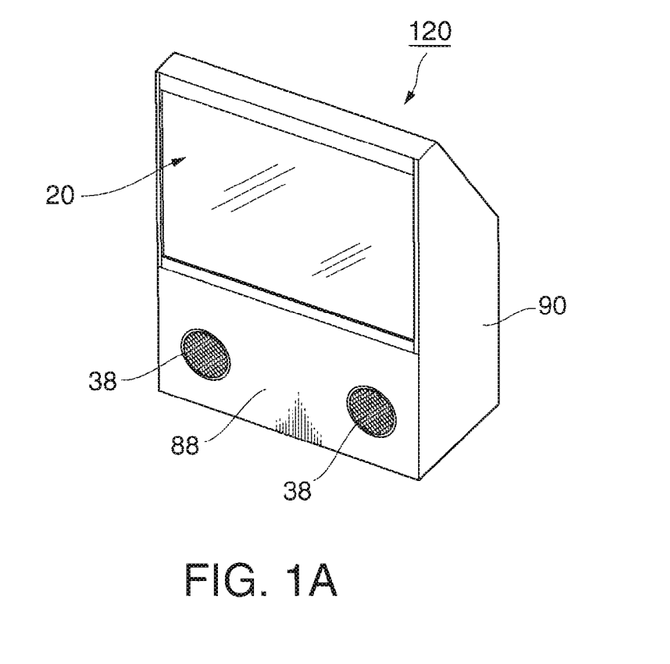
FIGS. 1A and 1B are diagrams illustrating a schematic structure of a rear projector according to an embodiment of the invention.
Figure 1B:
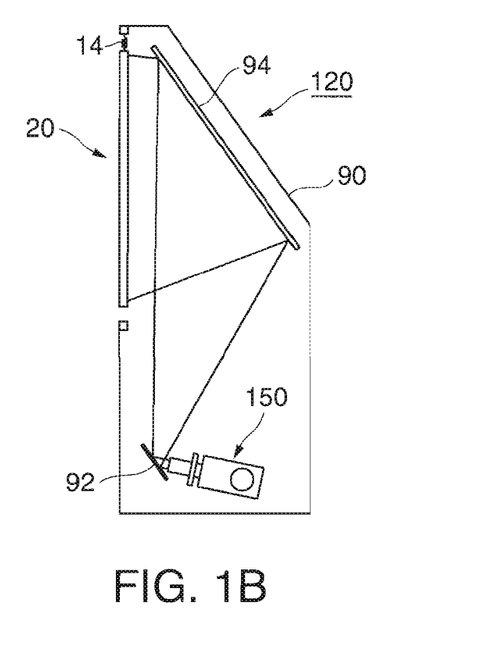

FIG. 1A is a perspective view illustrating a schematic structure of a rear projector 120 according to an embodiment of the invention. FIG. 1B is a side cross-sectional view illustrating the rear projector 120 shown in FIG. 1A. In the rear projector 120 according to this embodiment, light emitted from a light source is modulated by a light modulating unit, and the modulated light is projected onto a screen 20 to be diffused.

As shown in FIG. 1A, the rear projector 120 includes the screen 20 onto which an image is projected, and a casing 90 that is mounted on a side of a rear surface of the screen 20. A front panel 88 is provided at a portion of the casing 90 below the screen 20, and openings 38 for outputting a sound from a speaker are provided at left and right sides of the front panel 88.

Next, an inner structure of the casing 90 of the rear projector 120 will be described.

As shown in FIG. 1B, a projection optical system 150 is disposed on a lower side of an inner portion of the casing 90 in the rear projector 120. Reflective mirrors 92 and 94 are provided between the projection optical system 150 and the screen 20. The light emitted from the projection optical system 150 is reflected on the reflective mirrors 92 and 94, and is projected onto the screen 20 to be diffused.

Next, a schematic structure of the projection optical system 150 of the rear projector 120 will be described.

Figure 2:
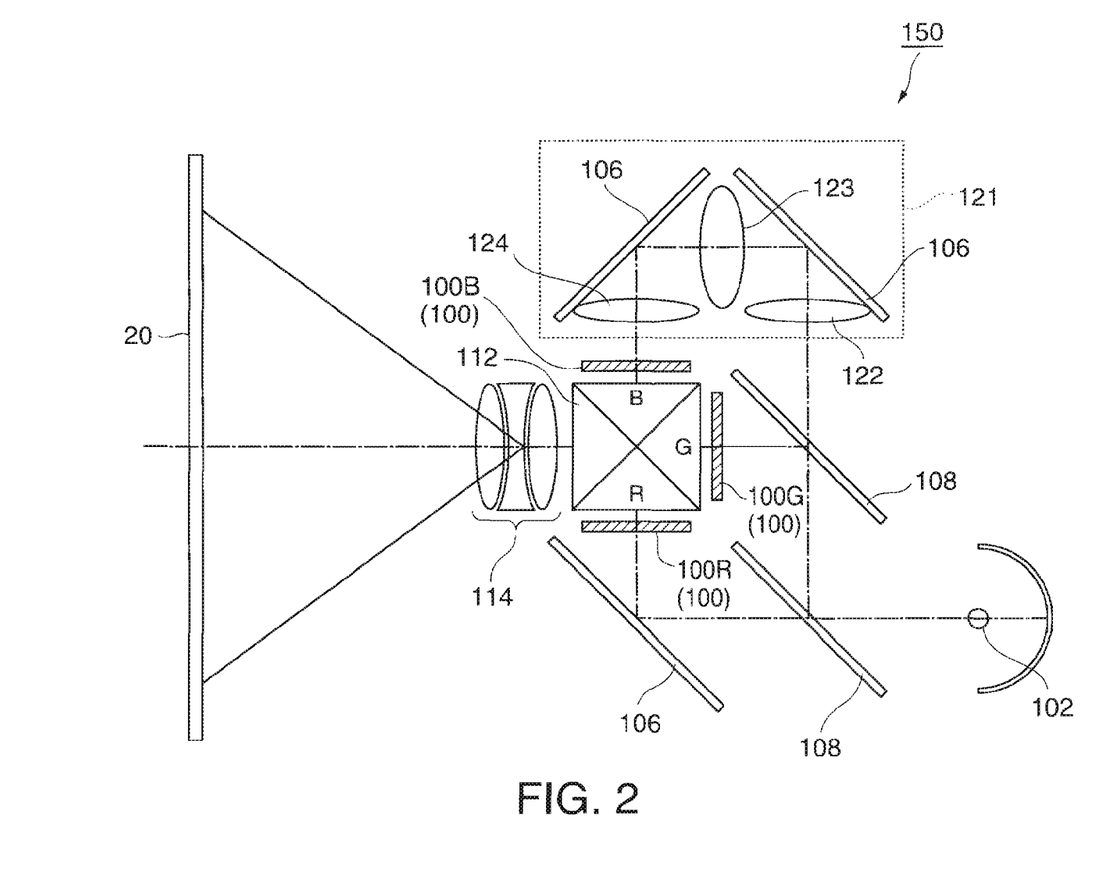
FIG. 2 is a diagram illustrating a schematic structure of a projection optical system of a rear projector according to an embodiment of the invention.

FIG. 2 is a diagram illustrating a schematic structure of a projection optical system 150 of a rear projector 120. In FIG. 2, the casing 90 that forms the rear projector 120 is omitted for the purpose of simplification.

The projection optical system 150 includes a light source 102, a light modulating element 100 that modulates the light emitted from the light source 102, and projection lenses 114 that projects the light modulated by the light modulating element 100. In this embodiment, liquid crystal light valves 100R, 100G, and 100B are used as the light modulating element 100.

As shown in FIG. 2, the projection optical system 150 is provided with the light source 102 that is a lamp unit that is composed of a white light source, such as a halogen lamp. The light that is emitted from the light source 102 to be the lamp unit is split into three primary colors of RGB by means of three mirrors 106 and two dichroic mirrors 108 that are disposed in the projection optical system 150, and is guided to liquid crystal light valves 100R (red), 100G (green), and 100B (blue) corresponding to the respective primary colors. In this case, the liquid crystal light valves 100R, 100G, and 100B are respectively driven in accordance with signals of the primary colors of R, G, and B supplied by an image signal processing circuit (not shown).

Further, a B (blue) light component has a long optical path as compared with the other R (red) or G (green) light components. In order to prevent an optical loss, the B light component is guided through a relay lens system 121 that is composed of an incident lens 122, a relay lens 123, and an emission lens 124.

The light beams that are respectively modulated by the liquid crystal light valves 100R, 100G, and 100B are incident on a dichroic prism 112 in three directions (liquid crystal light valves 100R, 100G, and 100B). The dichroic prism 112 refracts the R light component and the B light component at 90 degrees, and makes the G light component go straight, such that the light components emitted from light emission portions of the respective liquid crystal light valves 100R, 100G, and 100B are synthesized. In addition, the light that is emitted from each light emission portion and is synthesized is projected onto the screen 20 through the projection lens 114.

Next, a schematic structure of the screen 20 of the rear projector 120 will be described.

Figure 3:
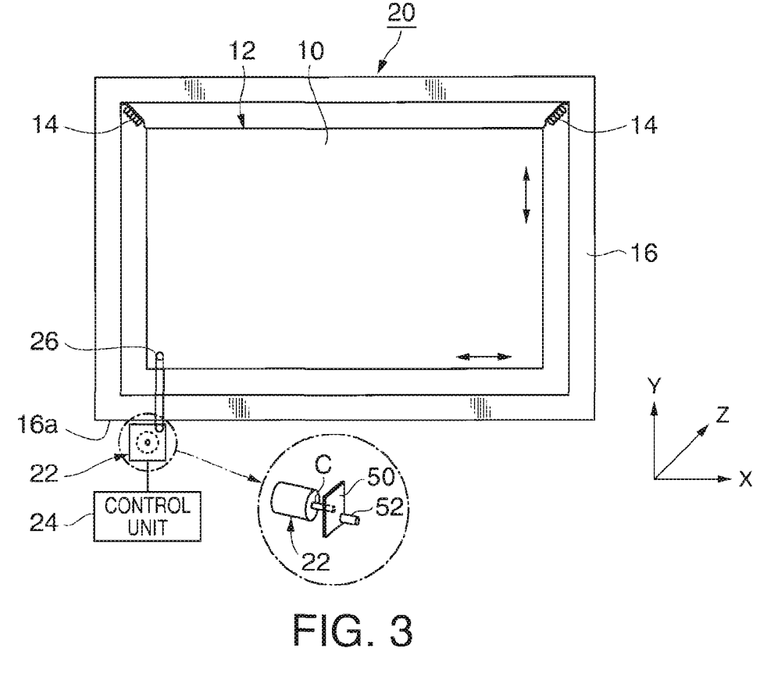
FIG. 3 is a diagram illustrating a schematic structure of a screen according to a first embodiment of the invention.

FIG. 3 is a plan view illustrating a schematic structure of a screen 20. In FIGS. 3 to 9, a screen main body 12 is disposed at a predetermined gap with a frame 16. However, in actual, as shown in FIGS. 1A and 1B, a portion of the frame 16 protrudes to the front surface of the frame main body 12, and the gap is covered with the protruding frame 16.

As shown in FIG. 3, the screen 20 includes the screen main body 12, springs 14, the frame (frame portion) 16, and a crank motor 22 (driving unit).

The screen main body 12 has a rectangular diffusion plate 10 (diffusion layer) in plan view. The diffusion plate 10 diffuses the light projected onto the screen main body 12 and expands a visual field of a viewer. In the diffusion plate 10, a diffusion material is uniformly dispersed. As the diffusion material, silicon oxide, alumina, calcium carbonate, glass bead, a copolymer such as an acrylic resin system, or an amorphous organic system material such as a silicon resin system are preferably used. Further, a hard coat layer (not shown) that protects the screen main body 12 including the diffusion plate 10 or the like is provided on the surface of the diffusion plate 10 at the side of the viewer.

The frame 16 is formed in a frame shape along the circumference of the diffusion plate 10, and is constructed to be integrated with the casing 90 shown in FIGS. 1A and 1B. The frame 16 and the diffusion plate 10 are disposed at a predetermined gap therebetween, and upper corners of the diffusion plate 10 are attached to the frame 16 through the springs 14 (elastic members) so as to rock (so as to wobble). That is, the diffusion plate 10 of the screen main body 12 suspends from the frame 16 by the springs 14. Further, in addition to the springs 14, an elastic member, such as a rubber member, which can expand and contract, may be used. Furthermore, in addition to the springs 14 and the elastic member, a supporting member, such as a wire, which can suspend the diffusion plate 10, may be used.

On an outer circumferential surface 16a of a lower left portion of the frame 16, the crank motor 22 is mounted. The crank motor 22 is connected to a control unit 24 that is provided in the casing 90. Further, the crank motor 22 is disposed such that its rotation shaft C is vertical to a surface of the diffusion plate 10. At a front end of the rotation shaft C, a rectangular plate member 50 is attached such that a surface of the plate member 5 0 is vertical to the rotation shaft C, A connecting rod 52, which extends to be vertical to the surface of the plate member 50, is attached to a corner of the plate member 50 shifted from the center (rotation shaft C) of the plate member 50.

Meanwhile, at a lower left corner of the diffusion plate 10 of the screen main body 12, a connecting rod 26 is mounted which extends to be vertical to the surface of the diffusion plate 10.

In addition, the connecting rod 52 of the crank motor 22 and the connecting rod 26 of the diffusion plate 10 are connected to each other by a ring-shaped rubber member 28. As a result, if the crank motor 22 is driven, the diffusion plate 10 can rotate around the rotation shaft C.

According to this embodiment, since the diffusion plate 10 of the screen main body 12 is attached to the frame 16 to rock, if the crank motor 22 is driven, the diffusion plate 10 moves in parallel to the surface of the diffusion plate 10 (x-y direction). As a result, a diffusion state of the light that passes through the diffusion plate 10 of the screen main body 12 is changed, and thus a pattern of an interference fringe that is generated by diffusion and diffraction of the diffusion plate 10 of the screen main body 12 is changed. Accordingly, since the interference of light is reduced, it is possible to reduce scintillation.

Further, according to this embodiment, the diffusion plate 10 of the screen main body 12 moves in parallel to the surface of the diffusion plate 10 (x-y direction), and does not move in a z direction orthogonal to the surface of the diffusion plate 10. Accordingly, defocus can be suppressed while scintillation is reduced. Furthermore, since the diffusion plate 10 of the screen main body 12 does not move in a z direction, the surface of the diffusion plate 10 does not form an air compressing surface, a sound and a vibration can be suppressed from being generated.

Furthermore, according to this embodiment, since the diffusion plate 10 is attached to the frame 16 through the springs 14, a power that is supplied from the motor 22 to the diffusion plate 10 of the screen main body 12 is transmitted to the springs 14. The power that has been transmitted to the springs 14 is repulsed from the diffusion plate 10 by means of an elastic force of the springs 14. As a result, in addition to the power supplied from the motor 22, the diffusion plate 10 of the screen main body 12 is biased by the springs 14, and moves in parallel to the surface of the diffusion plate 10. Accordingly, it is possible to further effectively move the diffusion plate 10.

Furthermore, according to this embodiment, since the motor 22 can rotate around the rotation shaft C that is vertical to the surface of the diffusion plate 10, it is possible to make the diffusion plate 10 of the screen main body 12 perform an eccentrically circular motion in parallel to the surface of the diffusion plate 10.

Further, according to the crank motor 22, since it is possible to make the diffusion plate 10 perform an eccentrically circular motion, the diffusion plate 10 where there is not a discontinuous point can move, different from the case of a reciprocating motion. Therefore, it is possible to further reduce the scintillation.

Second Embodiment

Next, a second embodiment of the invention will be described with reference to the accompanying drawings.

In the first embodiment, the diffusion plate suspends from the frame through the elastic members. However, in the second embodiment, a plurality of places of the diffusion plate are attached to the frame through the elastic members, different from the first embodiment. Further, since the other structure of the rear projector is the same as that of the first embodiment, the common constituent elements are denoted by the same reference numerals and the detailed description thereof is omitted.

Figure 4:
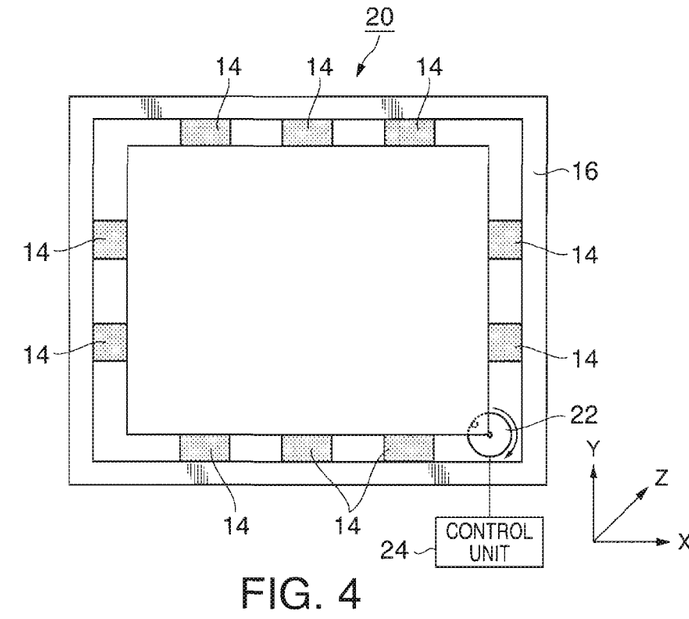
FIG. 4 is a diagram illustrating a schematic structure of a screen according to a second embodiment, of the invention.

FIG. 4 is a plan view illustrating a schematic structure of a screen 20.

Rubber members 14 are disposed at equal intervals along the circumference of the diffusion plate 10, and the diffusion plate 10 is attached to the frame 16 through the rubber members 14. As a result, the diffusion plate 10 is elastically supported by means of the rubber members 14 that are inserted between the diffusion plate 10 and the frame 16, and the diffusion plate 10 can rock in parallel to the surface of the diffusion plate 10 (x-y direction).

On the lower right side of the diffusion plate 10 of the screen main body 12 at the rear side, the above-described crank motor 22 is mounted. The crank motor 22 is connected to a control unit 24 that is provided in the casing 90.

Even in this embodiment, it is possible to achieve the same function and effect as the first embodiment.

Further, the member that is inserted between the diffusion plate 10 and the frame 16 is not limited to the rubber member, but may be the elastic member such as the spring, or an oil damper.

Third Embodiment

Next, a third embodiment of the invention will be described with reference to the accompanying drawings.

In the second embodiment, one driving unit is mounted in the diffusion plate, but in the third embodiment, a plurality of driving units are mounted in the diffusion plate, different from the second embodiment. Further, since the other structure of the rear projector is the same as that of the first embodiment, the common constituent elements are denoted by the same reference numerals and the detailed description thereof is omitted.

Figure 5:
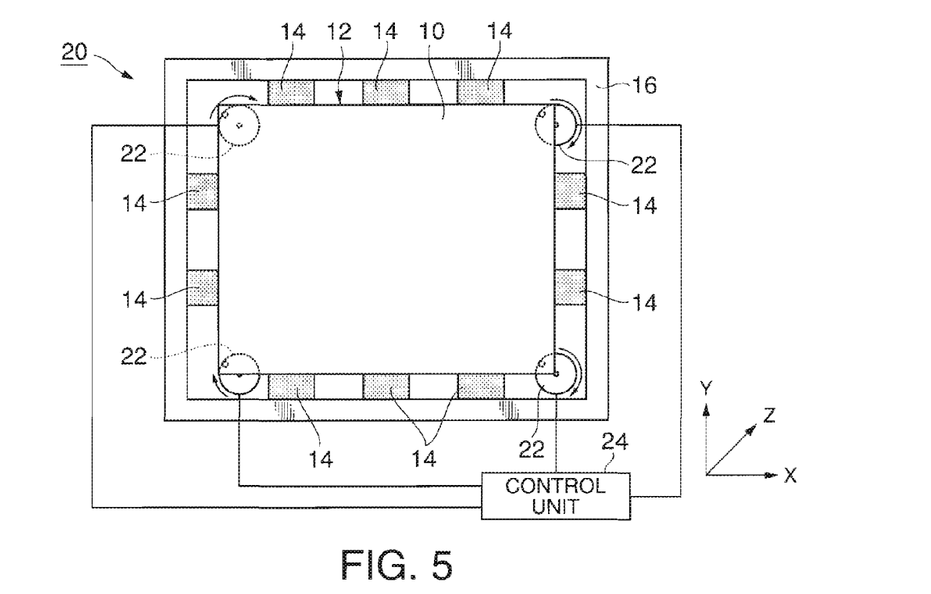
FIG. 5 is a diagram illustrating a schematic structure of a screen according to a third embodiment of the invention.

FIG. 5 is a plan view illustrating a schematic structure of a screen 20.

Rubber members 14 are disposed at equal intervals along the circumference of the diffusion plate 10, and the diffusion plate 10 is attached to the frame 16 through the rubber members 14. As a result, the diffusion plate 10 is elastically supported by means of the rubber members 14 that are inserted between the diffusion plate 10 and the frame 16, and the diffusion plate 10 can rock in parallel to the surface of the diffusion plate 10 (x-y direction).

At four corners of the diffusion plate 10 at the rear side, the crank motors 22 are mounted. Each of the crank motors 22 is connected to a control unit 24 that is provided in the casing 90. The control unit 24 synchronizes driving cycles of the four crank motors 22 and supplies driving signals to the four crank motors 22, and controls the rotation speed and the rotation direction of the four crank motors 22 such that they become equal to one another. Alternatively, deceleration gears for varying the driving cycles of the crank motors 22 may be provided, and the crank motors 22 may be driven in a state where the crank motors 22 are different from one another in the rotation speed and the rotation direction.

According to this embodiment, the four corners of the diffusion plate 10 of the screen main body 12 are mounted with the crank motors 22, and the crank motors 22 are simultaneously driven. Therefore, it is possible to smoothly move the diffusion plate 10.

Fourth Embodiment

Next, a fourth embodiment of the invention will be described with reference to the accompanying drawings.

In the third embodiment, the respective driving units are continuously driven, but in the fourth embodiment, the respective driving units are intermittently driven, different from the third embodiment. Further, since the other structure of the rear projector is the same as that of the first embodiment, the common constituent elements are denoted by the same reference numerals and the detailed description thereof is omitted.

Figure 6:
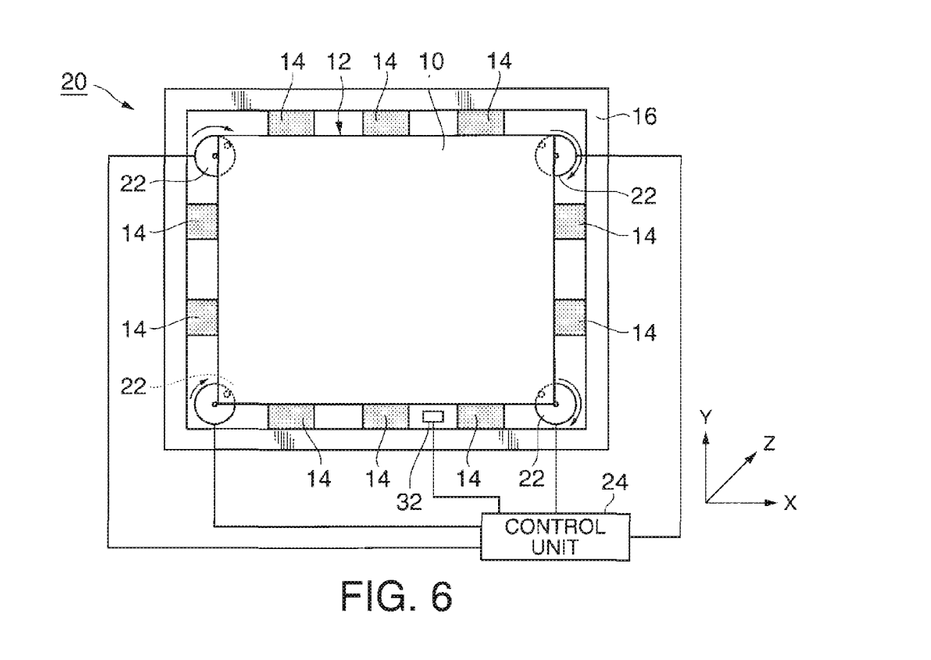
FIG. 6 is a diagram illustrating a schematic structure of a screen according to a fourth embodiment of the invention.

FIG. 6 is a plan view illustrating a schematic structure of a screen 20. FIGS. 7A to 7D are diagrams illustrating an operation of a screen 20.

As shown in FIG. 6, at four corners of the diffusion plate 10 at the rear side, DC motors 22 (driving units) are mounted. Each of the DC motors 22 is connected to a control unit 24 that is provided in the casing 90. The control unit 24 synchronizes driving cycles of the four DC motors 22 and supplies driving signals to the four DC motors 22, and controls the rotation speed and the rotation direction of the four DC motors 22 such that they become equal to one another.

Further, on the rear surface side of the diffusion plate 10, a position detecting sensor 32 is provided to detect a position of the diffusion plate 10. The position detecting sensor 32 is provided at a position where stopped is an operation of the diffusion plate 10 rotating by means of a biasing force at the time of the DC motor 22 being driven, when the driving of the DC motor 22 is stopped. In this embodiment, the position is referred to as a driving stopping position. Further, the position detecting sensor 32 is connected to the control unit 24, converts test light reflected on the diffusion plate 10 into an electric signal, and supplies the converted electric signal to the control unit 24.

Next, the operation of the diffusion plate 10 will be described with reference to FIGS. 6, and 7A to 7D.

Figure 7A:
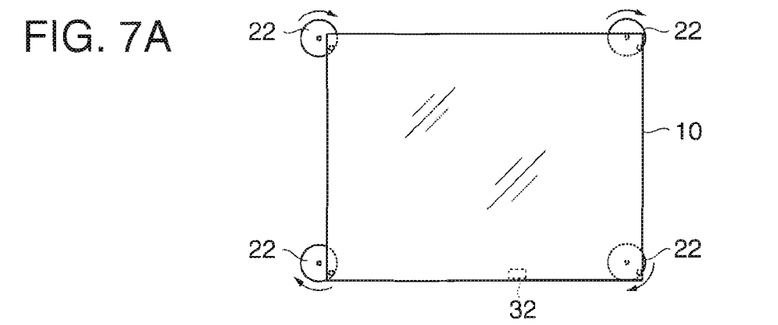
FIGS. 7A to 7D are plan views illustrating a screen that circularly moves when a motor is driven.
Figure 7B:
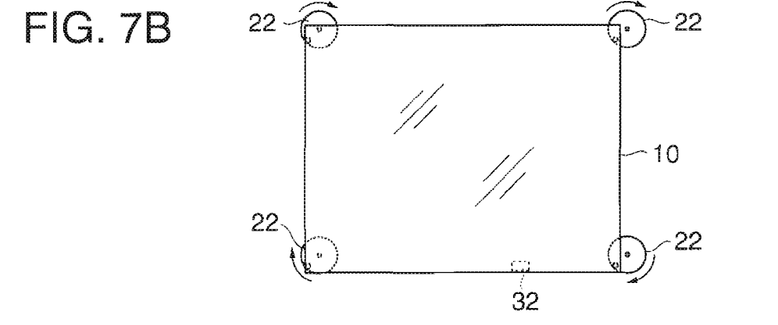

As shown in FIGS. 6, 7A, and 7B, if the driving signal is supplied from the control unit 24 to the DC motors 22, the four DC motors 22 that are located at the four locations are driven. As a result, the diffusion plate 10 that is connected to the DC motors 22 rotates in a clockwise direction in 7A to 7D.

At this time, since the position detecting sensor 32 and the diffusion plate 10 overlap each other in plan view, the position detecting sensor 32 detects the diffusion plate 10. For this reason, the control unit 24 continuously supplies the driving signal to the DC motors 22.

Figure 7C:
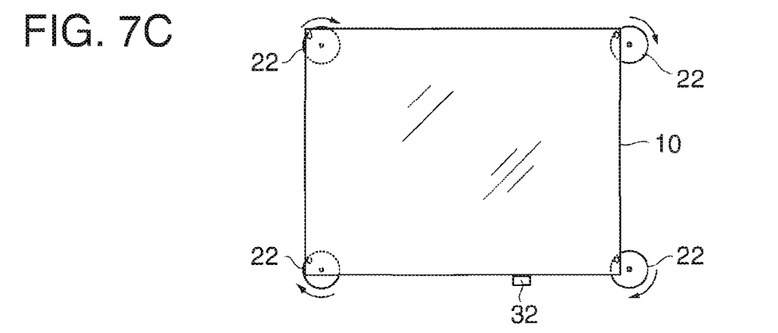

Next, as shown in FIG. 7C, if the diffusion plate 10 rotates to the driving stopping location, since the position detecting sensor 32 and the diffusion plate 10 do not overlap each other in plan view, the position detecting sensor 32 does not detect the diffusion plate 10. For this reason, the control unit 24 stops the supply of the driving signal to the DC motor 22. Even this case, the diffusion plate 10 rotates by means of the biasing force of the DC motor 22.

Figure 7D:
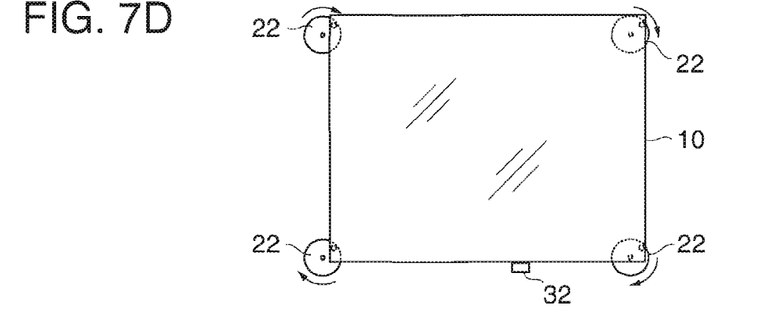

Subsequently, even when the diffusion plate 10 rotates to the location shown in FIG. 7D, since the position detecting sensor 32 and the diffusion plate 10 doe not overlap each other in plan view, the position detecting sensor 32 does not detect the diffusion 10. For this reason, the control unit 24 maintains the state where the supply of the driving signal to the DC motor 22 is stopped.

In addition, if the diffusion plate 10 rotates again to the location shown in FIG. 7A, the position detecting sensor 32 detects the diffusion plate 10, and the control unit 24 supplies the driving signal to the DC motor 22.

As such, in this embodiment, if the diffusion plate 10 rotates to the driving stopping location, the driving of the DC motor 22 is stopped. In the other cases, the DC motor 22 is driven, and the DC motor 22 is intermittently driven.

According to this embodiment, the same function and effect as the first embodiment can be achieved, and the diffusion plate 10 can move with a small energy, Fifth Embodiment Next, a fifth embodiment of the invention will be described with reference to the accompanying drawings.

In the first embodiment, the corners of the diffusion plate are attached to the frame by using the elastic members. However, in the fifth embodiment, guide units are provided in the diffusion plate, different from the first embodiment. Further, since the other structure of the rear projector is the same as that of the first embodiment, the common constituent elements are denoted by the same reference numerals and the detailed description thereof is omitted.

Figure 8A:
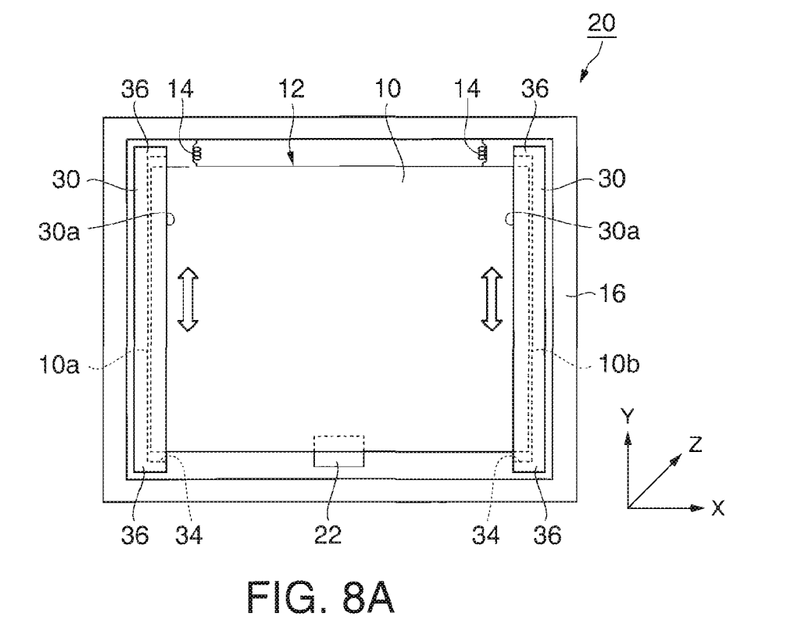
FIGS. 8A and 8B are diagrams illustrating a schematic structure of a screen according to a fifth embodiment of the invention.
Figure 8B:
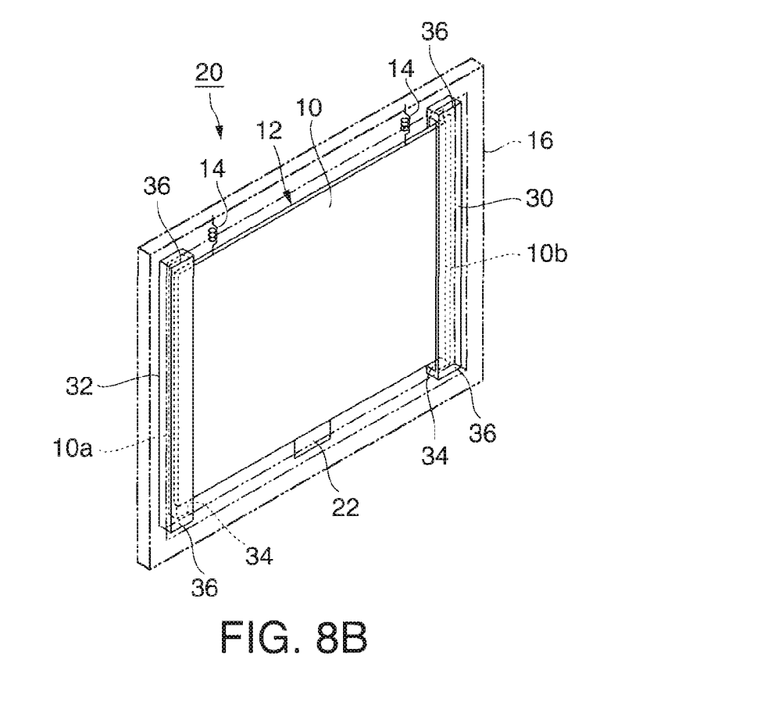

FIG. 8A is a plan view illustrating a schematic structure of a screen 20. FIG. 8B is a perspective view illustrating a screen 20 shown in FIG. 8A.

At a left side 10a and a right side 10b of the diffusion plate 10 of the screen main body 12 that face each other, elongated rectangular guide mechanisms 30 and 30 (guide units) are provided. In the surfaces 30a and 30a of the guide mechanisms 30 and 30 that face the diffusion plate 10, guide grooves 34, which extend along a longitudinal direction of the guide mechanisms 30 and 30, are formed. At both ends of the guide groove 34 in a longitudinal direction, anti-slipping portions 36 and 36 are provided to stop the sliding of the diffusion plate 10.

The upper corners of the diffusion plate 10 are attached to the frame 16 through the elastic members 14, such as rubber members, to rock. Further, a linear motor 22, which can reciprocate, is attached to the lower periphery of the diffusion plate 10 of the screen main body 12.

According to this embodiment, since the guide mechanisms 30 are provided along the sides 10a and 10b of the diffusion plate 10, the diffusion plate 10 moves in parallel to the surface of the diffusion plate 10 (y direction). Accordingly, it is possible to surely prevent the diffusion plate 10 from moving in a z direction. Further, defocus can be controlled while scintillation is reduced.

Sixth Embodiment

Next, a sixth embodiment of the invention will be described with reference to the accompanying drawings.

In the above-described embodiments, the screen main body is composed of a single layer diffusion plate. However, in the sixth embodiment, the screen main body is composed of a plurality of diffusion plates, different from the above-described embodiments. Further, since the other structure of the rear projector is the same as that of the first embodiment, the common constituent elements are denoted by the same reference numerals and the detailed description thereof is omitted.

Figure 9:
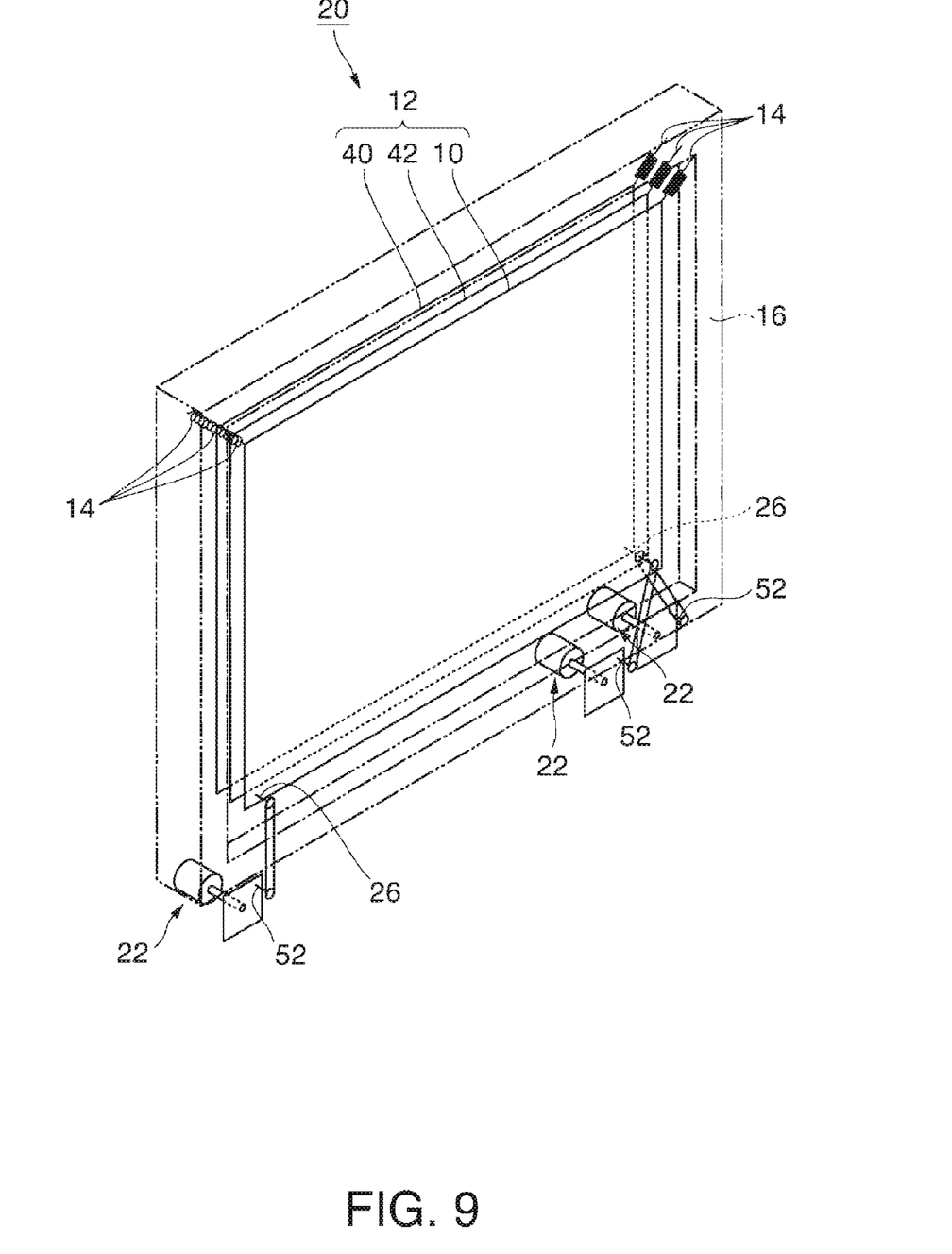
FIG. 9 is a diagram illustrating a schematic structure of a screen according to a sixth embodiment of the invention.
Figure 10:
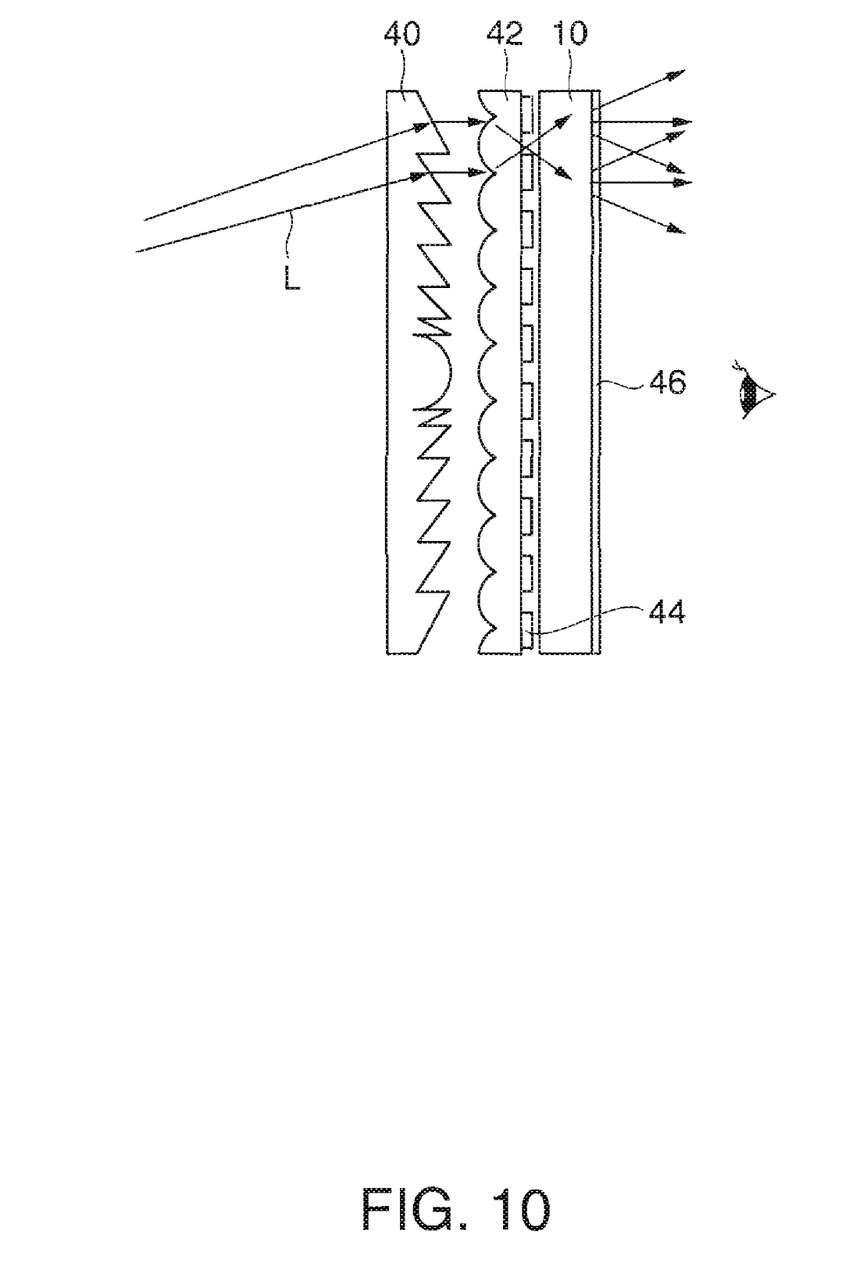
FIG. 10 is a diagram illustrating a schematic structure of a screen main body that has a plurality of diffusion function layers.

FIG. 9 is a perspective view illustrating a schematic structure of a screen main body 12 according to a sixth embodiment of the invention. FIG. 10 is a diagram illustrating structures of a plurality of diffusion plates.

As shown in FIGS. 9 and 10, the screen main body 12 includes diffusion plates 10, a lenticular lens 42 that compresses (condenses) the image, and a Fresnel lens 40 that converts the light projected onto the screen 20 into collimated light. These components are disposed in the order of the diffusion plates 10, the lenticular lens 42, and the Fresnel lens 40 when viewed from the viewer, on the optical axis L of the projected light.

A hard coat layer is provided on a surface of the diffusion plate 10 at the side of the viewer. Further, black masks 44 are formed in a lattice on the surface of the lenticular lens 42 at the side of the viewer.

As shown in FIG. 9, the diffusion plates 10, the lenticular lens 42, and the Fresnel lens 40 are attached to the frame 16 through the springs 14, 14, and 14 to rock. Further, the diffusion plates 10, the lenticular lens 42, and the Fresnel lens 40 are mounted with the crank motors 22, respectively. A connecting rod 52 is attached to each of the crank motors 22, and a connecting rod 26 corresponding to the connecting rod 52 is attached to each of the diffusion plates 10, the lenticular lens 42, and the Fresnel lens 40. In addition, the connecting rods 52 of the respective crank motors 22, and the connecting rods 26 of the diffusion plates 10, the lenticular lens 42, and the Fresnel lens 40 are connected to each other by means of ring-shaped rubber members 28.

In this embodiment, resonance frequencies of the springs 14, 14, and 14 that are attached to the diffusion plates 10, the lenticular lens 42, and the Fresnel lens 40 are different from one another. Elastic modulus of each of the springs 14, 14, and 14 may be caused to be different, such that each resonance frequency may be different. Further, the crank motors 22 are independently mounted on the diffusion plates 10, the lenticular lens 42, and the Fresnel lens 40, and thus a driving period of each of the crank motors 22 may be different. Alternatively, the combination thereof may be used.

According to this embodiment, the plurality of diffusion plates 10 are attached to the frame 16 through the springs 14 to rock, and the crank motors 22 are mounted on the diffusion plates 10. Therefore, each of the plurality of diffusion plates 10 relatively moves. As a result, as compared with the case where a single layer diffusion layer is used, even when the diffusion plates 10 slightly move, the diffusion characteristic and the pattern of the interference fringe are varied. Accordingly, the interference fringe is integrally averaged by means of a residual image effect of eyes of the viewer, and the scintillation can be more effectively reduced.

Further, the diffusion plate 10, the lenticular lens 42, and the Fresnel lens 40 are preferably disposed such that at least, portions of them come into surface contact with one another. In this case, at least one layer among the diffusion plate 10, the lenticular lens 42, and the Fresnel lens 40, for example, the crank motor 22 may be only mounted on the diffusion plate 10.

As a result, the power that is transmitted from the motor 22 to the diffusion plate 10, the lenticular lens 42, and the Fresnel lens 40 is transmitted to the neighboring layers due to the friction of the contact portions. Accordingly, it is possible to manually move the diffusion plate 10, the lenticular lens 42, and the Fresnel lens 40 on which the crank motors 22 are not mounted, and the scintillation can be more effectively reduced.

Seventh Embodiment

Next, a seventh embodiment of the invention will be described with reference to the accompanying drawings.

In this embodiment, the light modulating element and a scanning unit are used as the structure of the rear projector. In this point, this embodiment is different from the above-described embodiments. Further, since the other structure of the rear projector is the same as that of the first embodiment, the common constituent elements are denoted by the same reference numerals and the detailed description thereof is omitted.

Figure 11:
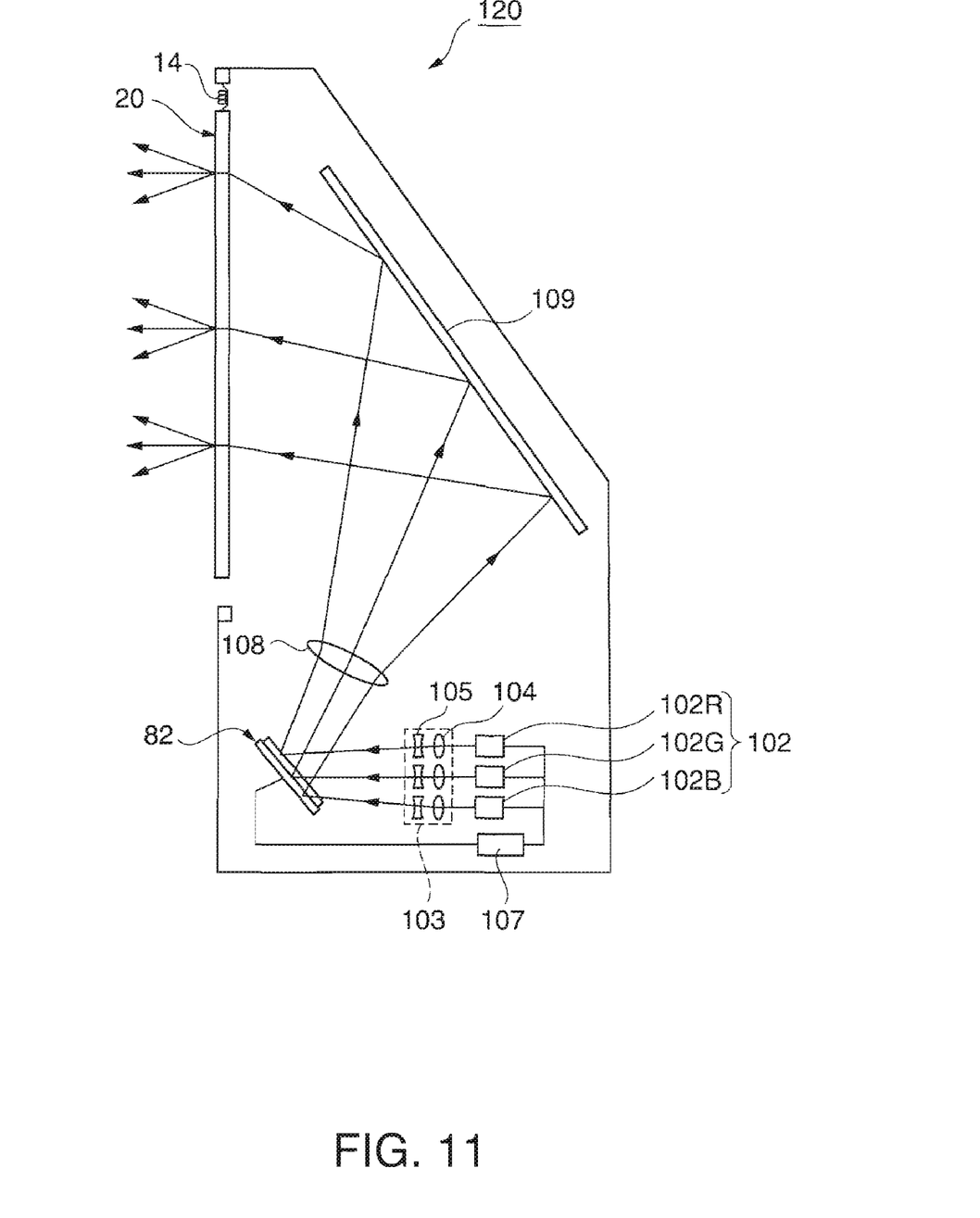
FIG. 11 is a diagram illustrating a schematic structure of a screen according to a seventh embodiment of the invention.

FIG. 11 is a cross-sectional view illustrating a schematic structure of a rear projector 120.

As shown in FIG. 11, the rear projector 120 according to this embodiment includes a light source 102 that emits laser light, a lens optical system 103 that includes a collimated optical system 104 and a beam shaping optical system 105, a scanner 82 that scans the incident laser light in a two-dimensional direction, a projection lens 108 that projects the scanned light to be diffused, and a reflective mirror 109 that reflects the projected light toward the screen 120. The light source 102 includes a red laser diode 102R that emits red laser light, a green laser diode 102G that emits green laser light, and a blue laser diode 102B that emits blue laser light.

The laser light that is emitted from the laser diodes 102R, 102G, and 102B is incident on the scanner 82 through the lens optical system 103. The incident laser light is scanned in a two-dimensional direction by the scanner 82, and is then projected onto the screen 20 through the projection lens 108 and the reflective mirror 109. In this way, the rear projector 120 according to this embodiment causes the scanner 82 to scan the laser light emitted from the light source 102 on the screen 20, thereby forming an image.

As in this embodiment, even in the scan-type rear projector 120 using the laser light source, since the screen 20 can move by the driving unit 22, the same function and effect as the above-described embodiment can be achieved, and the scintillation can be effectively reduced.

The technical range of the invention is not limited to the above-described embodiments, and various modifications and changes can be made without departing from the sprit and scope of the invention.

For example, in the above-described embodiments, the crank motor or the DC motor is used as the driving unit, but a piezoelectric actuator may be used. In addition, a displacement of the piezoelectric actuator may be increased by using an amplifying unit, and may be transmitted to the diffusion plate 10.

Further, the rotation frequency of the crank motor is set to be substantially equal to an oscillation frequency (resonance frequency) of the diffusion plate (and the lenticular lens, the Fresnel lens, or the like), and oscillation of the set frequency of the motor may be applied to the diffusion plate. As a result, since the diffusion plate resonates, it is possible to effectively drive the diffusion plate or the like with the low energy.

In the above-described embodiments, the transmissive liquid crystal light valve is used as the light modulating element. However, a reflective liquid crystal light valve and a small-sized mirror array device can be used as the light modulating element. At this time, a structure of the projection optical system is appropriately changed.

The entire disclosure of Japanese Patent Application No. 2006-113449, filed Apr. 14, 2006 is expressly incorporated by reference herein.

What is claimed is:

1. A screen comprising:
   a screen main body that has a diffusion layer;
   a frame that is provided along a circumference of the screen main body, and to which the diffusion layer is attached through supporting members to rock; and
   a plurality of driving units that are mounted on the diffusion layer and move the diffusion layer in parallel to a surface of the diffusion layer, wherein each driving unit has a power source.

2. The screen according to claim 1,
   wherein the supporting members are elastic members.

3. The screen according to claim 1,
   wherein each of the plurality of driving units rotates around a rotation shaft that extends to be substantially vertical to the surface of the diffusion layer, and
   The plurality of driving units are mounted on the diffusion layer of the screen main body.

4. The screen according to claim 3,
   wherein the diffusion layer of the screen main body has a rectangular shape,
   a driving unit of the plurality of driving units is mounted on at least two locations of corners of the diffusion layer of the screen main body, and
   the driving units that are mounted on the corners of the diffusion layer are simultaneously driven.

5. The screen according to claim 1,
   wherein the diffusion layer of the screen main body has a rectangular shape, and
   on at least one side of the diffusion layer of the screen main body, a guide unit is provided to slidably move the diffusion layer in a direction along the side.

6. The screen according to claim 1,
   wherein the screen main body has a plurality of diffusion layers,
   the plurality of diffusion layers are disposed on an optical path axis of light that is projected onto the plurality of diffusion layers,
   at least two diffusion layers of the plurality of diffusion layers are attached to the frame through the supporting members to rock, and
   the plurality of driving units are mounted on at least one diffusion layer of the plurality of diffusion layers that are attached to the frame through the supporting members.

7. The screen according to claim 6,
   wherein at least portions of neighboring diffusion layers among the plurality of diffusion layers attached to the frame through the supporting members comes into contact with each other, and
   the plurality of driving units are mounted on at least one diffusion layer of the diffusion layers coming into contact with each other.

8. The screen according to claim 6,
   wherein the supporting member that corresponds to each of the diffusion layers attached to the frame has a different resonance frequency.

9. The screen according to claim 1,
   wherein a resonance frequency of the supporting members and a driving frequency of the plurality of driving units are substantially equal to each other.

10. A rear projector comprising:
    a light source that emits light;
    a light modulating element that modulates the light emitted from the light source; and
    the screen according to claim 1 onto which the light modulated by the light modulating element is projected.

11. An image display device comprising:
    a light source that emits light;
    the screen according to claim 1; and
    a scanning unit that scans the light emitted from the light source on the screen.

* * * * *